Figure 1:
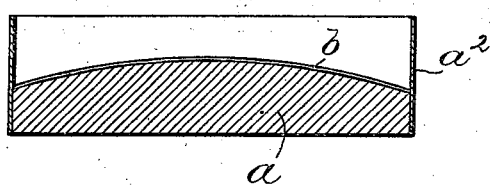

(No Model.)

J. JACOBSON.
MIRROR AND METHOD OF MAKING SAME.

No. 501,514.  Patented July 18, 1893.

Witnesses
Jas. J. Maloney.
M. E. Hill.

Inventor.
John Jacobson.
by Jos. P. Livermore
Att'y.

UNITED STATES PATENT OFFICE.

JOHN JACOBSON, OF BOSTON, MASSACHUSETTS.

MIRROR AND METHOD OF MAKING SAME.

SPECIFICATION forming part of Letters Patent No. 501,514, dated July 18, 1893.

Application filed October 31, 1892. Serial No. 450,463. (No model.)

*To all whom it may concern:*

Be it known that I, JOHN JACOBSON, of Boston, county of Suffolk, State of Massachusetts, have invented an Improvement in Mirrors and Methods of Making the Same, of which the following description, in connection with the accompanying drawings, is a specification, like letters on the drawings representing like parts.

My invention relates to a metallic surfaced mirror or speculum and method of making the same, the object being to produce at low cost a mirror having a suitable surface for optical purposes.

In a former patent, No. 465,996, dated December 29, 1891, I have shown and described a method of making mirrors in which a metallic film is deposited upon a form having a suitable polished surface converse in shape to that required for the mirror (that is the surface of the form being concave if the mirror is to be convex, and vice versa), and a backing composed, in part at least, of plastic material is applied to the metallic film while on the form, and the said backing with the film adhering to it is subsequently removed from the form so that the surface of the film that was in contact with the form when deposited thereon becomes the exposed reflecting surface of the mirror.

The present invention consists in a specific method of carrying out the plan of operation described in said former patent and in a specific construction of the resulting mirror which method and mirror have been invented by me as the result of long experimenting for the purpose of discovering a suitable material or combination of materials to be used in making the mirrors.

In my former patent I have described gum shellac as the best material known to me at that time to be used as a plastic cement to constitute in whole or in part the backing for the metallic film, but the said material has some objections such as liability to contract or to change its shape in the course of time, under the conditions to which the mirror is subjected in use.

The method forming the subject of the present invention consists in the following steps:—first, depositing upon a properly polished and finished mold a film of metal; second, applying a back of plaster of paris to said film while on the mold, said plaster of paris being applied while in the semi-fluid condition requisite for making plaster casts, and being permitted to set, harden, and dry upon the film; third, completely filling the pores of the said plaster of paris, so as to expel the air therefrom, by a suitable material, preferably paraffine or mineral wax; and finally removing the film with its backing of plaster of paris and paraffine from the form and thus obtaining the mirror forming the subject of this invention, composed of a deposited reflecting metallic surface film and a base of plaster of paris, having its pores filled with paraffine or analogous wax-like material. If the air is not expelled from the pores of the plaster backing, the latter with the metallic film cannot be effectively removed from the form as the film is likely to adhere as strongly to the form as to the backing and to thus become torn or to wholly fail to be removed from the form; and if it should be removed it would still be likely to break away from the plaster in places and thus destroy the perfect optical shape and condition of the surface. By excluding the air from the pores of the plaster, however these objections are overcome and a permanent and durable mirror is produced which is not liable to destruction under the conditions of use and which will not deteriorate in any way under ordinary conditions.

Figure 2:
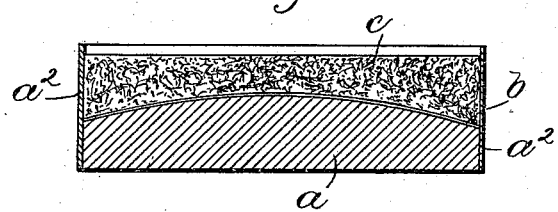
Figure 3:
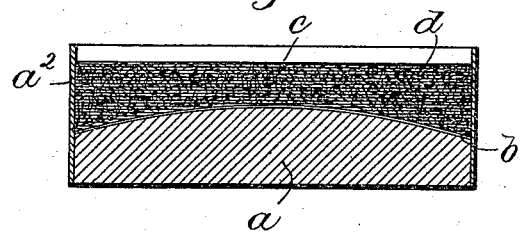
Figure 4:

In the drawings Figure 1, represents the form $a$ with the metallic film $b$ deposited thereon, said form being provided with a peripheral flange or rim $a^2$ which may be employed to contain the solution from which the metal is deposited, and also to produce a suitable mold to contain the plaster of paris when applied in plastic condition. Fig. 2 represents the mold and film $a$ and $b$ as shown in Fig. 1, and the backing $c$ of plaster of paris, set and hardened on the said film. Fig. 3 represents the same parts as shown in Fig. 2, but with the pores of the plaster of paris filled with wax-like material, preferably paraffine, as indicated at $d$ to exclude the air from the pores and thus insure perfect adhesion between the plaster and metallic film, and Fig. 4 represents the completed mirror, all the said figures being shown in section transverse to the form and mirror.

The reflecting film *b* is usually composed of metallic silver.

I claim—

1. As an improved article of manufacture the herein described mirror, composed of a deposited metallic reflecting surface, a base of plaster of paris cast thereon, and an air expelling filling in the pores of the said plaster of paris base, substantially as set forth.

2. That improvement in the art of making metallic mirrors which consists in depositing upon a suitably shaped and finished mold or form a film of metal whose reflecting surface next to the mold is completed and finished by deposition thereon; then applying a backing of plaster of paris to the film while on the mold, and permitting the same to set and harden, then filling the pores of the said plaster of paris backing with a wax-like air excluding material and finally removing the said backing with the film adhering thereto from the mold, substantially as described.

In testimony whereof I have signed my name to this specification in the presence of two subscribing witnesses.

JOHN JACOBSON.

Witnesses:
    JOS. P. LIVERMORE,
    M. E. HILL.